Sept. 2, 1947.                C. W. MORDEN                2,426,943
                         COMPOSITE BUILDING UNIT
                         Filed April 26, 1943            4 Sheets-Sheet 1

CHARLES W. MORDEN
INVENTOR

BY Geisler and Geisler
ATTORNEYS

Sept. 2, 1947.   C. W. MORDEN   2,426,943
COMPOSITE BUILDING UNIT
Filed April 26, 1943   4 Sheets-Sheet 2
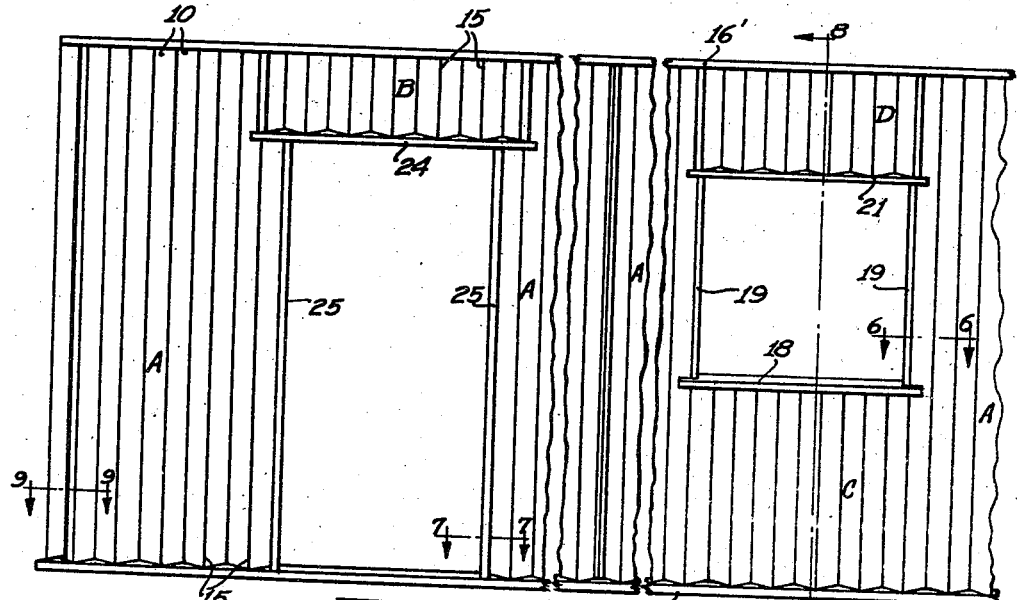
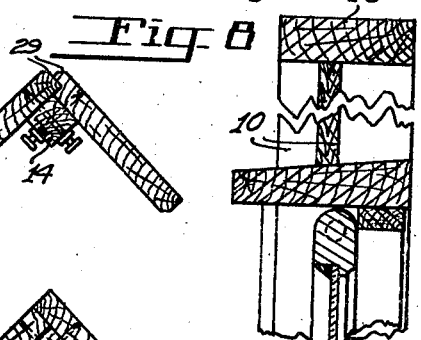
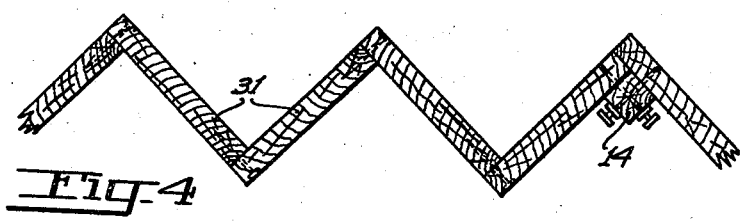
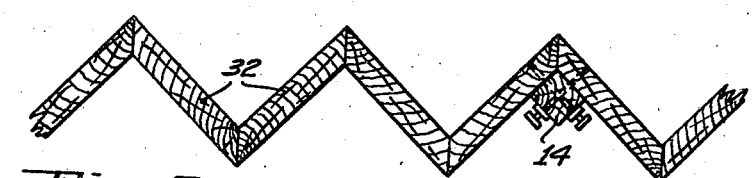
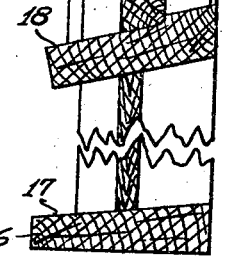
CHARLES W. MORDEN
INVENTOR
BY *Geisler and Geisler*
ATTORNEYS

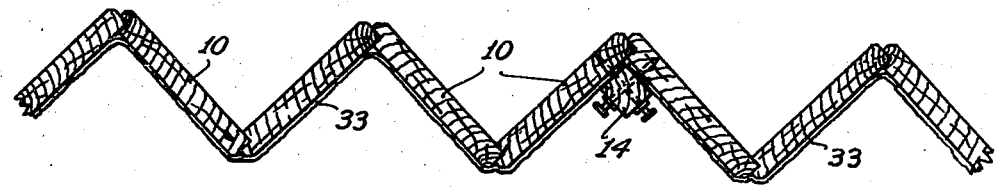
Fig. 10
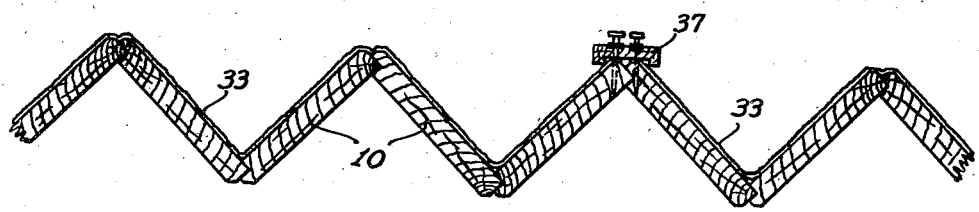
Fig. 11
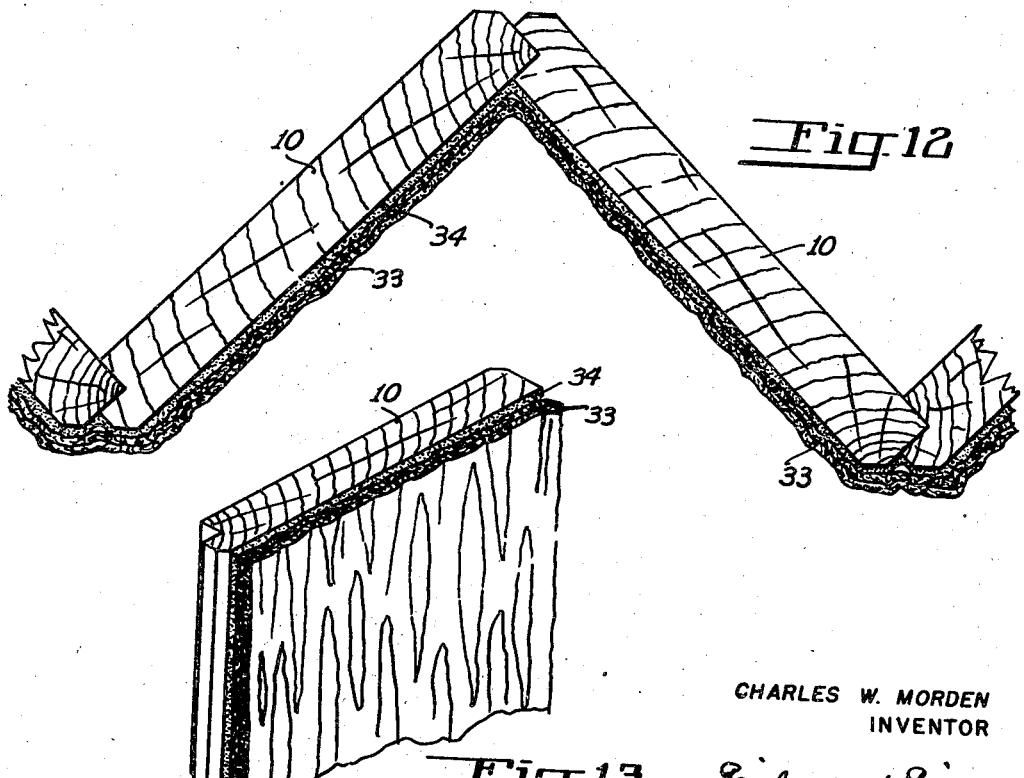
Fig. 12
Fig. 13

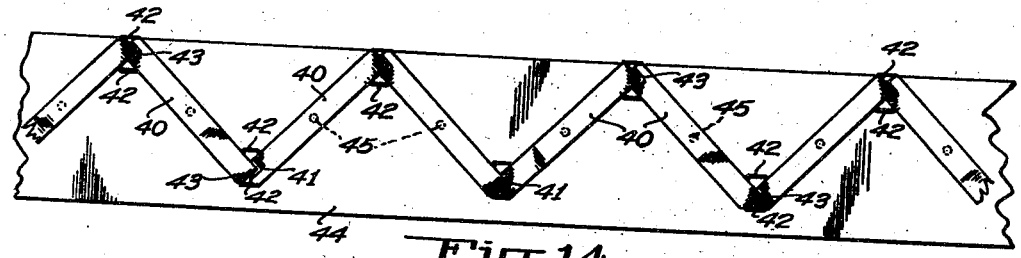
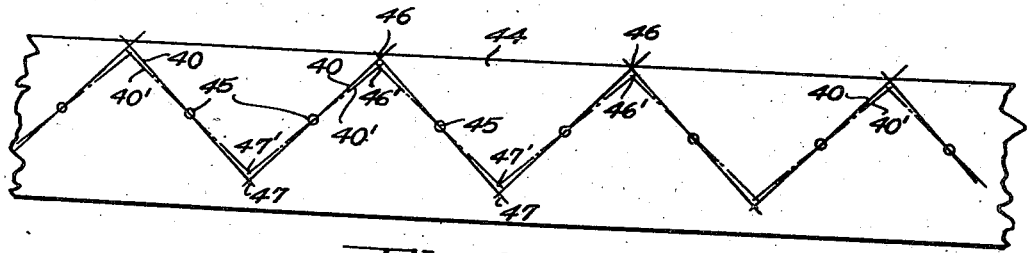
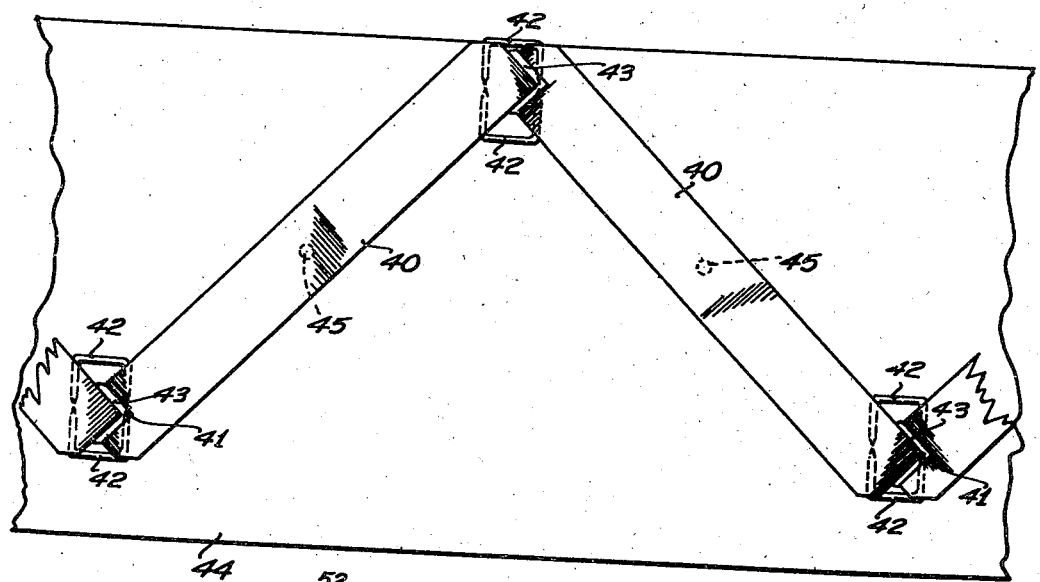
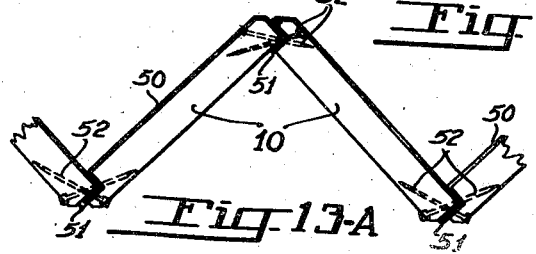

Patented Sept. 2, 1947

2,426,943

UNITED STATES PATENT OFFICE 2,426,943

COMPOSITE BUILDING UNIT

Charles W. Morden, Portland, Oreg.

Application April 26, 1943, Serial No. 484,573

1 Claim. (Cl. 20—4)

This invention relates to wooden building construction, particularly to single-story buildings and to wall structure, although the invention may also be employed to advantage in larger buildings and in roof and floor structure, or may be used in constructing large wooden bins, tanks, etc.

More specifically, this invention relates to that type of building construction in which pre-fabricated wall or partition sections, or composite structural members or floor, wall, or roof, are desired as a means of providing a simplified, inexpensive, easily erected and readily demountable structure.

One object of this invention is to provide a composite building unit to serve as a satisfactory wall section in place of the usual wall construction, eliminating the necessity of any wall studding and making it possible, if desired, to dispense with any special wall surfacing.

Another object of this invention is to provide a pre-fabricated wall section, suitable for inside or outside walls, which may be used alone for such purposes, or which may be used in conjunction with any outside or inside wall surfacing in any ordinary building construction, and, when so used, would be more satisfactory than ordinary studding.

A further object of this invention is to provide a prefabricated wall section or panel from a plurality of boards so arranged and secured together as to prevent any opening of the joints between them due to moisture changes in the lumber.

A still further object of this invention is to provide a composite building unit having unusual strength for the size of material employed and thus making the unit suitable for use by itself in building construction without requiring the usual reinforcement of studding, joists or rafters.

An additional object is to provide a composite building unit which may be easily and inexpensively fabricated into any desired size out of boards of the same cross section but of various lengths, including boards of shorter lengths which would otherwise be wasted, and which can also be made out of artificial or manufactured lumber; and to have such units in convenient form for nesting and shipping.

These and other objects I have been able to attain by making a composite building unit of individual members firmly secured at their longitudinal edges and arranged in zig-zag formation in the manner hereafter described, and by employing such pre-fabricated unit in building construction in the manner hereinafter explained.

In the following description and explanation reference is made to the accompanying drawings in which:

Fig. 2 shows a portion of an outside wall constructed from a plurality of my composite units in accordance with my invention, the outside door and window casings having been omitted from this figure for the sake of clarity;

Fig. 3 is a fragmentary end view of a portion of two adjacent composite units in a wall construction, showing my preferred manner of securing the individual members together at their longitudinal edges, and illustrating also the manner in which adjacent composite units may be secured to each other in forming a wall construction such as that illustrated in Fig. 2;

Figs. 4 and 5 are views similar to Fig. 3 but illustrating modified ways in which the individual members in the composite unit may be secured together;

Figure 1:
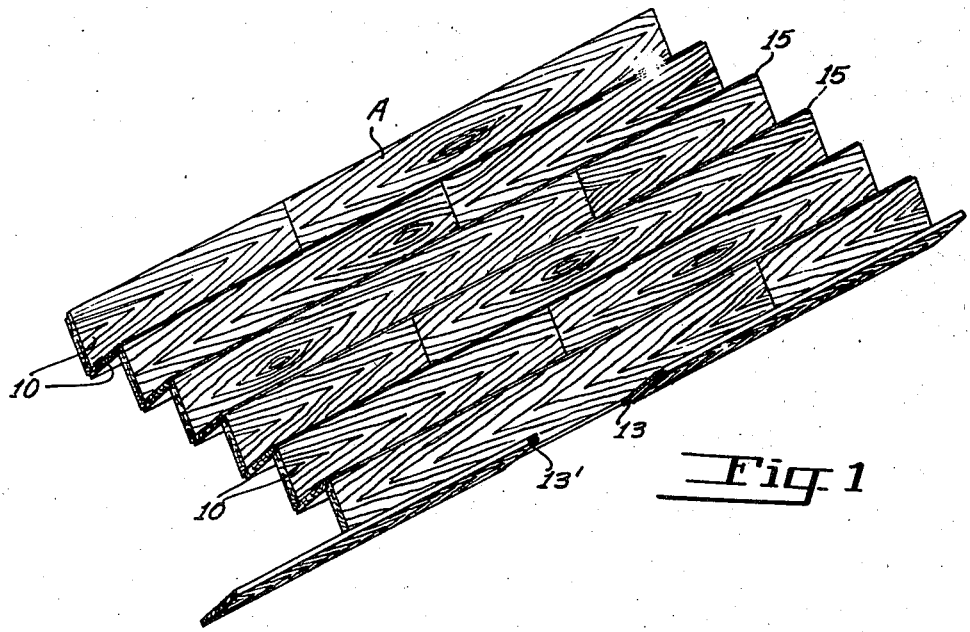
Figure 1 is a view, in perspective, of a large size composite unit formed in accordance with my invention, showing one of the individual members in the same partly removed in order to disclose the tongue-and-groove joining of the adjacent ends of the members.
Figure 6:
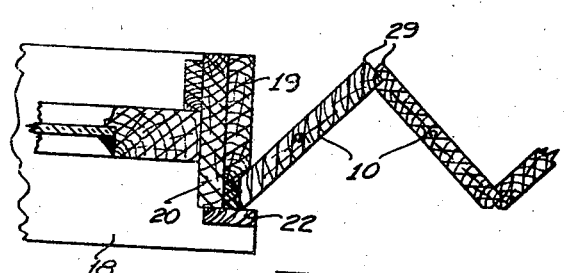
Figure 9:
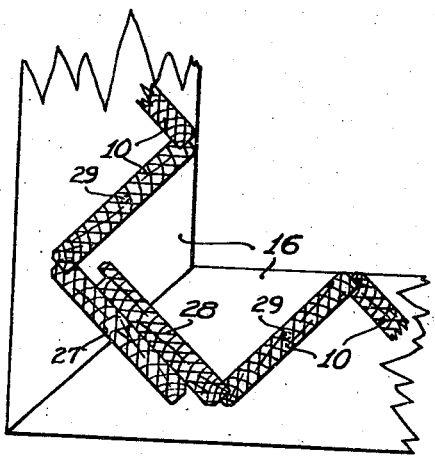
Figure 7:
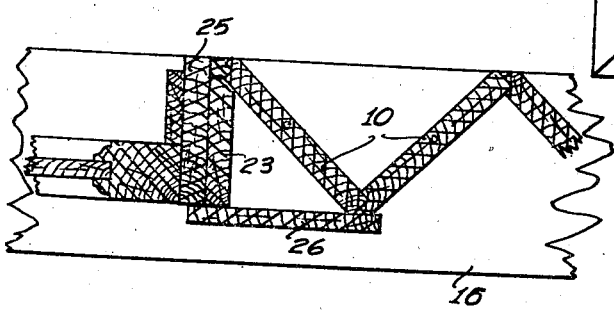

Fig. 6 a fragmentary horizontal section of a wall, formed in accordance with my invention, showing the mounting of the window structure, the section corresponding to the line 6—6 of Fig. 2, but with the window casing and sash added to the skeleton wall of Fig. 2;

Fig. 7 is a fragmentary horizontal section of the wall showing the mounting of the door frame, the section corresponding to the line 7—7 of Fig. 1 with the door frame and casing added to the skeleton walls;

Fig. 8 is a fragmentary transverse section of an outer wall formed of my composite units taken on the line 8—8 of Fig. 2;

Fig. 9 is a fragmentary section of an outside corner of a wall constructed in accordance with my invention showing one manner of securing my composite units together at a corner intersection, the section corresponding to the line 9—9 of Fig. 2;

Fig. 10 is a fragmentary end view of a portion of two adjacent composite units in a wall construction, similar to Fig. 3, but showing a special surfacing as having been applied to the outer face of each composite unit in order to provide a special exterior finish on the wall when set up;

Fig. 11 is a similar fragmentary end view of a portion of two adjacent units arranged for a roof construction, the top or exposed face of the composite units similarly having had the same special surfacing applied thereto in the pre-fabrication of said units in order that a finished exterior roof surface will be produced without exterior painting or further surfacing or any other treatment;

Fig. 12 is an enlarged end view of a portion of one of the specially finished units of Fig. 10 or Fig. 11;

Fig. 13 is a fragmentary view, in perspective, of one of the members of such a surfaced unit, showing the surfacing attached;

Fig. 13A is a fragmentary end view of a unit showing a modified way of securing the surfacing and forming the joints;

Fig. 14 is a fragmentary end view of a composite unit showing the same attached to a sill or plate or transverse member;

Fig. 15 is an enlarged end view of a pair of adjacent members of Fig. 14 showing more clearly the modified method in which the longitudinal joints between the members are formed; and Fig. 16 is a diagrammatic representation of the effect of lateral contraction or expansion of the individual members of a unit when the unit is embodied in a construction.

Referring first to Figs. 1 and 3, my composite building unit, designated as a whole by A, is formed from a plurality of members (in this case wooden boards) 10 of similar cross section and of any convenient lengths, joined at their edges approximately at right-angles to each other in zig-zag formation, resembling a corrugated or accordion-pleated composite building section.

I have found it very satisfactory in carrying out my invention to use what are commonly known as "1 by 6" wooden boards for this purpose (which, when boards of dressed or finished lumber are used, means that the cross section of the individual boards is approximately ¾ inch by 5⅝ inches). While the boards may be joined at their longitudinal edges in a number of ways, I prefer to cut a notch 11 (Fig. 3) along one longitudinal edge of each board, the boards being arranged with their notches alternating and the notch of each board being adapted to accommodate the unnotched edge of the adjacent board. When wooden boards are used for the composite unit the longitudinal edges are preferably securely glued together by strong waterproof glue and are also preferably cross-nailed together by the nails 12. In this manner a strong joint is formed at each ridge and valley of the zig-zag formation. The abutting ends of boards are formed with tongue-and-groove respectively, as indicated at 13 and 13' in Fig. 1, and these abutting ends are glued together. As will be evident from Fig. 1, I can employ short lengths of boards to make up my composite unit. However, in such case the joints should be staggered in order to secure the desired strength and rigidity throughout the entire unit.

When my unit is made from "1 by 6" boards (¾ inch by 5⅝ inches finished lumber), the outside edges or ridges 15 will be approximately 8 inches apart. Inasmuch as it is customary in wall construction to have the wall studding at 16 inch intervals, the 8 inch spacing of the edges or ridges 15, being a multiple of the 16 inch spacing of studding, is very convenient for the framing of doors and windows and, when additional outside or inside wall surfacing is desired on a wall constructed from such units, provides twice the number of nailing points, for example, for inside wall panels of plywood or gypsum board, thus giving such panels better support. Where the individual boards of the units are secured together at their longitudinal edges in the manner illustrated in Fig. 3, I prefer to plane off the opposite corner edges 29, 29 of each board as indicated in Fig. 3. This affords a better nailing surface at each ridge or apex in the composite unit for extra outside or inside surfacing when such additional surfacing is desired.

The composite unit, which I have illustrated in Fig. 1, is formed into convenient sizes. Preferably I make the large and small sizes of the same width and differing only in length. In a wall structure such as that illustrated in Fig. 2 the large unit A would be used between doors and windows, while shorter units, such as B, C or D would be used above doors and below and above windows, depending upon the sizes of the windows and doors. Obviously my composite unit could be made in any number of sizes if desired.

In securing adjacent units together in a wall or other structure, I prefer to use an additional nailing and sealing strip 14 (Fig. 3), approximately square in cross section, at such connecting joint. This reinforces the joint, and, by presenting a pair of larger nailing surfaces, enables the units to be held firmly together by ordinary nailing alone at such places, without danger of such joints later opening up. Also, when only a temporary or demountable structure is desired, this nailing may be done in such a manner (for example by double-headed nails), that the structure may be easily dismantled and the units separated quickly by pulling out the nails. Screws of course can be used instead of nails.

When a wall structure is to be set up, a convenient number of the units required are assembled and arranged on the floor in the order in which they will appear in the wall and with the inner face down. The units are secured together consecutively in the manner described in the preceding paragraph. Then a bottom sill 16 and top plate 16' (Fig. 2), are nailed to the ends of the units. Preferably the nails extend through the plate or sill to the approximate center line of each board as indicated at 29 in Fig. 9. The resulting wall section is now ready to be set up. Obviously this assembling and securing together of the composite units and sills and plates requires much less time and labor than even the cheapest and roughest form of ordinary wall construction employing boards and studding.

The sills and plates are preferably not attached to the units until the units are assembled on the job, for the attaching of the sill members to the ends of the pre-fabricated units beforehand would prevent the nesting of the units for shipment, and such nesting is an important feature of the pre-fabricated units, since it enables the units to require practically no more shipping space than would be required for ordinary unfabricated lumber.

The chief advantage of the wall construction, such as that illustrated in Fig. 2, aside from its strength and the speed with which it may be set up, resides in the fact that the cross-grain contraction or expansion of the individual boards under changed moisture conditions will not cause cracks to appear or joints to open up in the wall. The fact that boards contract or expand across the grain under changed moisture conditions is well known. Thus if the individual boards of which the composite units illustrated in Fig. 2 are formed were arranged all in the same plane instead of being arranged in zig-zag formation, with their edges glued together so as to form a flat panel it would be impossible to prevent the joints between the boards from opening up, or considerable lateral shrinkage of a wall panel occurring as the moisture in the panel boards dried out. And, if the individual boards had been very thoroughly dried beforehand then, when subjected to moisture, the entire panel would likewise be subjected to considerable expansion across the grain which, in case it had been tightly fitted into position in the wall structure, might cause the panel to buckle. Such conditions are familiar to all persons who have had any experience with building construction. However, in my invention, the accordion-pleated arrangement of the individual boards provides sufficient inherent flexibility transversely through the unit so that the total cross-grain contraction or expansion of the individual boards will be absorbed without requiring any change in the overall width of the unit, and without danger of the opening up of the joints between the individual boards. The actual effect of lateral contraction or expansion of the individual members of the unit will be explained further later in this description.

In quick, cheap or temporary construction my composite unit may be employed without any further surfacing. The wall will be strong and weather-tight, as explained above, and entirely satisfactory for temporary buildings or small housing construction. When heavier and more permanent construction is desired, a wall such as that illustrated in Fig. 2 may have additional surfacing added either on the outside or on the inside, or on both. Any surfacing, such as exterior sheathing, inside panelling, lath and plaster, etc. may be used the same as with ordinary walls having the customary studding. However, since the wall structure made in accordance with my invention will have the spacing of the ridges of the composite units only 8 inches apart instead of the usual 16 inch spacing of the studding, a more solid wall and a better insulated and more sound-proof wall will be produced as a result of the cellular wall construction, with the relatively small and isolated dead air spaces between the surface walls. For example, if plywood is used to finish the inner wall surface it will be found that the finished plywood wall with the panels secured every 8 inches, instead of every 16 inches, will be more solid, more sound-proof, and generally more satisfactory as a result.

The bottom sill 16, particularly in outside walls, should have its upper surface slightly sloped, as indicated at 17 in Fig. 8, so as to make the bottom of the wall more weather-tight, and the abutting bottom ends of the units in the wall structure should be cut at a corresponding angle in order to fit tight against this surface of the bottom sill.

Window and door framing are provided for very easily by means of prefabricated members arranged to be secured to the wall units around the window and door openings.

In the window openings prefabricated window frames with hung windows are inserted. The window frames include a bottom window sill 18 (Figs. 6 and 8), side members 19, window frame members 20, and the top sill 21. The window frames are slipped into place before the top plate is nailed to the wall section. Finally the outside casing 22 is attached in place.

The door framing is carried out in a similar manner. The bottom sill 15 of the wall serves also as the door sill. The prefabricated side members 23 and top sill 24 are similar to those used for the windows, and the door frame members 25 and outside door casing 26 (Fig. 7) complete the door framing.

Where walls intersect, as, for instance, at corners, the boards or members of the adjoining units can overlap as illustrated in Fig. 9. These overlapping members 27 and 28 of the units from the two intersecting walls can easily be nailed together and this results in a strong and satisfactory corner construction which requires a minimum of labor.

Figs. 4 and 5, which illustrate optional ways in which the individual boards or members which make up the composite unit may be secured together at their longitudinal edges, are self-explanatory. The members are preferably glued as well as nailed together at their longitudinal edges. In the manner of joining the members 31 illustrated in Fig. 4, no cutting or grooving of the longitudinal edges is required. In the joining illustrated in Fig. 5 the longitudinal edges of the members 32 are cut to a bevel of about 45. Whether the composite unit is made up of members joined as shown in Fig. 4, or as shown in Fig. 5, the joining of adjacent composite units can be carried out in the same manner as previously described with the extra nailing and sealing strip 14 used at the joints between the units.

Although I have described the manner in which my composite unit can be employed building wall construction, its use is not confined to walls alone, or even to building construction alone. Units of proper length can be employed as a support for flooring in place of the usual joists, and I have that such units may be used with particular advantage for making roofs of buildings. When used in roof construction the units require no rafters and when placed in position with the proper roof pitch their top surface may be covered with roofing felt, or with any other waterproof material or surfacing, or the top exposed faces of the boards or members may be merely painted or otherwise waterproofed and such plastic or pliable waterproof material as "mastic" used as an extra seal over the glue joints between the boards or members. At the junction between separate units in the roof a suitable outside ridge batten would be used in place of the ordinary sealing strip. Roofs so constructed give somewhat the external appearance of being formed of V-shaped tiles.

Figs. 10 to 13 inclusive illustrate how a surfacing material can be included in a composite unit, on either or both faces. In these figures I show a special outside surfacing 33 attached to the outside face of the composite unit. The surfacing 33 comprises a two-ply sheet of creped heavy craft paper with an asphaltum composition used as a laminating and impregnating medium. Such material is tough, durable, weather and water proof, and that the fact that the plies are creped enables it to stretch if necessary and thus avoid any tendency to crack or split.

This surfacing material 33 is attached to the outer face of the composite unit preferably when the unit is fabricated, since it does not interfere with the nesting of the units in shipment. It is secured to the surface of the members 10 of the unit preferably by a heavy cement 34 (Fig. 12) which can be applied to the surface of the members or to the material before attaching the material. The creped material illustrated is of course applied with the crepe folds or corrugations extending lengthwise of the members, permitting lateral expansion with the individual members of the unit as previously mentioned. Furthermore, since this material itself is substantially moisture proof, it has the added advantage, when used as the outside surfacing of the unit, of keeping moisture from the members and thus minimizing their lateral expansion and contraction under changed moisture conditions which might otherwise take place. Such a surfacing also covers over any defects in the boards, such as might be encountered in cheaper grades of lumber.

In Fig. 10, which illustrates this surfacing attached to units used in wall construction, it will be noted that the sealing strips 14 are placed over the longitudinal edge of the surfacing material 33 at the juncture between two units. This prevents any tendency for the surfacing material to pull loose at the longitudinal edges of the units.

In Fig. 11, which illustrates this surfacing material attached to units to be used for a roof, it will be noticed that the material is attached to the upper face of the units so that the longitudinal edges of the units and surfacing material can be covered by a suitable batten 37 which seals the joints and similarly prevents the longitudinal edge of the surfacing material from pulling loose from the roof surface.

Such surfacing materials lend themselves to many adaptations in decorative effects, in addition to their value in increasing the insulating and weather-tight properties of the wall or roof structure. Thus the outside paper or other surfacing could be coated and sanded to simulate cement or stucco, and similar surfacing attached to the inside face of the units used for wall construction would lend itself to original interior decorative effects.

In the modified construction shown in Fig. 13A the special surfacing material 50 is formed with folds 51 which are inserted between the joints of the individual members 10 when the unit is fabricated. The glue or cement between the joints is omitted. The members are secured together by the cross nailing shown at 52. Joints formed in this manner with the folded material inserted therein will be slightly flexible and the material keeps the joints sealed. With the surfacing material secured at the joints in this manner it is not necessary for the material to be cemented to the surface of the members.

My composite unit may also be advantageously employed in the construction of cylindrical wooden tanks or bins of large diameter. When made in the manner described the composite unit has sufficient flexibility to enable it to be curved slightly to conform to the perimeter of a cylindrical wall of large diameter, and when a tank or bin is formed with such a cylindrical wall, and the wall is banded on the outside, in the manner of ordinary wooden tanks, a resulting construction is attained which is not only strong and durable, but which will also not be injured by any moisture changes in the wood.

Other ways of employing my composite unit may suggest themselves. It is not my intention to limit this invention to any particular use. However, the most important use of my invention I have found to be in connection with the construction of small buildings, such as army barracks and emergency housing projects, particularly where it is desired to have buildings so constructed that they may easily be demounted for setting up again in other locations. The corrugated appearance of the composite walls of buildings constructed in accordance with my invention, when no additional outside surfacing is used, will be more attractive than many other types of temporary inexpensive construction heretofore used for similar purposes, and the corrugated external surfaces presented by my composite building units are quite effective when more or less modernistic architectural designs are followed.

In the drawings I have shown my composite unit as made up of wooden boards. However, the individual members of the unit might be made in any of the number of ways in which "artificial lumber," or lumber substitutes, or composition boards, are made, and such members, jointed together at their longitudinal edges and arranged in zig-zag formation in the same manner as the wooden boards illustrated.

As mentioned previously, one of the main objects of my invention is to provide a composite building unit which will have sufficient inherent lateral flexibility to enable the width of the unit to remain constant under varying conditions of service, including changing moisture conditions, when the unit is incorporated in a structure, and also to permit the maintenance of sealed joints throughout each unit of the structure as well as between adjacent units. When wooden boards are used for the individual members of the unit the boards themselves will have some flexibility, and if the boards are nailed and glued together along their longitudinal edges, with the joints formed in any of the ways illustrated in Figs. 3, 4, and 5, there will be some additional slight flexibility at the joints should this be required. If heavier or thicker boards are used for the individual members, or if "artificial" lumber is used, such as asbestos boards and the like, so that the individual members themselves will have but little, if any, flexibility, then it may be desirable to provide for greater flexibility at the longitudinal joints between the members. Also if the composite units are fabricated in substantial widths it may be necessary to provide reinforced joints to prevent breaking at or near the longitudinal joints as the composite units are nested and shipped or handled.

Figs. 14 and 15 illustrate an improved method of forming reinforced and somewhat flexible joints between the individual members 40 of the unit. One longitudinal edge of each member 40 is notched as at 41 in the same manner as shown in Fig. 3 and the members are similarly arranged with their notches alternating and the notch of each member adapted to accommodate the unnotched edge of the adjacent member. Instead of ordinary nails or screws at the joints staples 42 are employed, preferably on both sides of the unit, the staples at opposite sides of each joint being staggered. In place of glue as an additional sealing means for the joints in this construction a more or less plastic adhesive or cement 43 would preferably be used. Such a material permits more flexibility of the joint while maintaining the desired seal. The staples 42 not only hold the members securely together while permitting some flexibility but also are less apt to cause the edges of the members to split off with the flexing of the joint than ordinary nails or screws. Such staples offer the further advantage that may easily be pried out by any simple tool or bar when it is desired to disconnect the members at a joint. This same means can be used for joining units together at their adjacent edges, the staples and pliable adhesive being very suitable for joints between units for the same reasons.

In describing a wall construction in which my unit is employed I have explained how bottom sills and top plates of the wall are attached to the adjacent ends of the members, preferably by nailing, or otherwise securing the sill or plate to the approximate center line of each member. This not only holds the members and units in place but has a further function to be explained with reference to Figure 16 which diagrammatically represents the members 40 of a unit attached to the sill or plate 44 by the nails 45.

Let it be assumed the members of the unit in the wall construction first occupy the full line position shown in Fig. 16, their longitudinal joints being at the points indicated at 46 and 47. Now let it be assumed that the individual members 40, for one reason or another, contract laterally to a slight extent, such as the familiar cross grain contraction occurring in lumber with the loss of moisture. Since the members are held together at their longitudinal edges, and since they are also attached at the points 45 to the transversely extending member 44, the tendency will be for the members 40 to pivot slightly and assume the broken line position indicated at 40' in Fig. 16. The joints or ridges will thus be moved inwardly to the points 46' and 47'. However, the points 46' will be in transverse alinement with the points 46 respectively, and similarly the points 47' will be in transverse alinement respectively with the points 47. In other words, the consecutive distance between the ridges 46, 46 is not changed when the ridges assume the position 46', and the same is true of the ridges 47. Thus not only does the width of the entire unit not change with the contraction of the individual members but, when the individual members are attached in this manner to a sill, plate, or similar member, the distance between the ridges or joints on either side does not change. This is also particularly important if surfacing, such as exterior sheating or inside panelling, plywood, etc., is attached to the wall constructed in the manner described.

The points 45 at which the ends of the individual members 40 are secured to the member 44 need not necessarily be at the center, but nevertheless should be in the same relative position in each member so that the slight pivoting of each member, under the special conditions described, will be substantially the same.

When my units are used in roof construction the ends of the members of the unit should be attached to the roof ridge member in the same manner, the roof ridge member corresponding to the member 44 in Fig. 16.

Various further modifications in the manner of joining the members of the unit, in the manner of joining adjacent units, and in the manner of employing my composite unit in a building construction are possible within the scope of my invention. The sealed joints may be formed either with or without the employment of adhesive.

I claim:

A building construction comprising a plurality of prefabricated composite units, said units composed of members set in zig-zag formation and joined at their longitudinal edges so as to cause said units to have inherent lateral flexibility, said units arranged side by side, means for securing the side portions of adjacent units together, a transverse member extending across the ends of adjacent units, and means for securing the individual members of said units to said transverse member at a corresponding point on the ends of each of said individual members of the units for the purpose described.

CHARLES W. MORDEN.

REFERENCES CITED

The following references are of record in the file of this patent:

UNITED STATES PATENTS

| Number | Name | Date |
|---|---|---|
| 40,191 | Shidler | Oct. 6, 1863 |
| 1,201,811 | Dupont | Oct. 17, 1916 |
| 2,334,113 | Malarkey | Nov. 9, 1943 |
| 957,605 | Gaynor | May 10, 1910 |
| 2,101,836 | Benedict | Dec. 14, 1937 |

FOREIGN PATENTS

| Number | Country | Date |
|---|---|---|
| 330,056 | Great Britain | Nov. 8, 1928 |
| 50,107 | Sweden | Dec. 4, 1918 |
| 91,498 | Sweden | Dec. 16, 1937 |
| 432,138 | France | Sept. 28, 1911 |